United States Patent [19]

Eastman

[11] Patent Number: 4,696,010
[45] Date of Patent: Sep. 22, 1987

[54] THERMALLY STABILIZED LASER CAVITY

[75] Inventor: George Y. Eastman, Lancaster, Pa.

[73] Assignee: Thermacore, Inc., Lancaster, Pa.

[21] Appl. No.: 886,169

[22] Filed: Jul. 16, 1986

[51] Int. Cl.$^4$ .................................................. H01S 3/04
[52] U.S. Cl. ...................................... 372/34; 372/107; 372/98; 372/65
[58] Field of Search ............................... 372/65, 34, 98

[56] References Cited

U.S. PATENT DOCUMENTS

| | | | |
|---|---|---|---|
| 3,582,190 | 6/1971 | Smith | 350/310 |
| 3,784,929 | 1/1974 | Joy, Jr. | 331/94.5 |
| 3,855,543 | 12/1974 | Timmermans | 331/94.5 |
| 3,942,880 | 3/1976 | Zeiders | 350/310 |
| 4,276,520 | 6/1981 | Rosenberg | 331/94.5 |
| 4,448,832 | 5/1984 | Kidwell | 428/113 |
| 4,613,972 | 9/1986 | Bettman | 372/65 |

FOREIGN PATENT DOCUMENTS

| | | | |
|---|---|---|---|
| 0095937 | 7/1980 | Japan | 372/34 |
| 2158635 | 11/1985 | United Kingdom | 372/34 |

Primary Examiner—Leon Scott, Jr.
Attorney, Agent, or Firm—Martin Fruitman

[57] ABSTRACT

A support structure for a gas laser cavity in which the longitudinal support members are constructed as identical heat pipes with a common thermal interconnection. With this common thermal system, thermal effects and, therefore, thermal expansions are equalized for all members and the laser cavity maintains alignment despite changes in operating temperatures.

8 Claims, 4 Drawing Figures

THERMALLY STABILIZED LASER CAVITY

SUMMARY OF THE INVENTION

This invention deals generally with coherent light generators, or lasers, and specifically with temperature control of the cavity support structure.

A common structure for gas laser cavities is one in which several parallel longitudinal support members support laser mirror structures at both ends of the sets of supports. The laser then operates by basically resonating a single frequency light beam which is reflected back and forth between the two mirrors. However, as the support members change temperature, either because of outside factors or from the heat generated from the laser itself, thermal expansion can cause changes in the length of one or more of the members. If only those on one side of the cavity change length it will cause the aligned mirrors to tilt relative to each other, and with the exaggeration of the angle caused by the relatively long light path, the light beam is likely to strike the mirror at a non-perpendicular angle. The laser is likely to lose power or even stop functioning when this occurs.

The most common solution to this problem has been to build the support members of low thermal expansion materials, but regardless of how low the thermal expansion is, there is always some minimal amount, and very little is needed to cause problems.

Another approach to the problem is to construct a support structure which, although the individual materials expand, is constructed in a manner so that the expansion is mechanically compensated to negate the thermal expansion. Not only is such an approach usually very complicated mechanically, but invariably the actual compensation for temperature difference is satisfactory only over a very limited range of temperatures.

Finally, and perhaps the most commonly used solution, has been to control the heat to which the support structure is subjected. This is done either by shielding the structure to prevent heat from reaching it, by cooling the structure itself to prevent changes in temperature or by distributing the heat to attempt to affect the entire structure equally.

The previous efforts at these approaches have generally had unsatisfactory results because of the inability to completely equalize and control the heat to which various parts of the support structure are subjected.

The present invention accomplishes the goal of thermal stability of a laser cavity by approaching the problem of temperature equalization and control in a new manner. The present invention uses heat pipes as physical support members and maintains the heat pipes at the same temperature by means of a common thermal interconnection.

Thus the sets of support members which hold the mirrors between them are themselves constructed as heat pipes. The simplest manner to accomplish this is to form the support members as cylindrical heat pipes, so that what, in a more conventional structure, would be a set of parallel rods forming a cage-like structure is, in the present invention, actually a set of cylindrical rod-like heat pipes.

The heat pipes operate as a self contained heat activated evaporating and condensing system which results in very little temperature differential from one end of the heat pipe to the other. Externally they appear as simple cylindrical casings and internally their only significant structure is a wick, usually metal screen or sintered metal, formed to be in intimate contact with the inside surface of the cylindrical casing. Non-condensible gases are removed from inside the casings, and a limited amount of vaporizable liquid is placed within it before the casing is tightly sealed.

Heat pipes are operated only by the heat they transfer from one part of the casing to another. When heat is applied to one end of the heat pipe, or, in fact, anywhere along its length, it causes the liquid inside the casing at that location to evaporate, and the vapor pressure moves the vapor throughout the interior of the casing. At the coolest region of the heat pipe the vapor condenses to liquid which then is moved, by the wick's capillary action, back to the original evaporator region to be evaporated again.

Because of the heat of evaporation of the liquid, heat is moved, along with the vapor, from the evaporator to the condenser, and since both vaporization and condensation take place at nearly the same temperature there is essentially no temperature difference between the evaporator and condenser, regardless of their physical separation.

It is this heat pipe action which is used in the present invention to assure that the support members are isothermal, that each support member operates at one temperature over its entire length. However, in addition, the several heat pipes are also coupled together thermally so that no significant temperature difference can exist among the various support members.

The simplest of several methods of thermal coupling is to attach all the individual heat pipes to one or more thermally conductive structures.

In one embodiment of the invention these thermally conductive members are end plates to which the heat pipe ends are attached. With such an arrangement the heat pipe ends can only vary in temperature by the temperature differential across the end plates. When a good thermal conductor such as aluminum is used with a significant thickness to the plate, this temperature differential is minimal.

Another means for thermal stabilization between the support members is to construct the several support members as branches of the same heat pipe. In this arrangement, the heat pipe casings all open into a common chamber. Within this common chamber the wicks of all the heat pipes are joined together or joined to a common wick and the vapor spaces of all the heat pipes join together or feed into a common vapor space.

In one embodiment of the invention this common section of the branched heat pipe is constructed as a chamber, located at one end of the laser cavity, so that it joins the heat pipes with relatively short runs of capillary wicks, and also interconnects the heat pipes with a common vapor manifold. Such an interconnection helps assure that the vapor pressure is the same in all branches and thereby better assures the same temperature.

An added feature can also be added to such a common vapor manifold to not only assure the same temperature, but to also control the temperature at which the structure operates.

It is well understood in the heat pipe art that when a reservoir of non-condensible gas is attached to the condenser end of a heat pipe, the pressure of the non-condensible gas can be used to control the operating temperature of the heat pipe. Therefore, in this embodiment of the invention, a single source of non-condensible gas feeding multiple heat pipe branches produces a common pressure in all the heat pipe branches, and therefore forces all of them to operate not only with the common thermal coupling but at precisely the same temperature.

The present invention therefore solves the thermal balance problem of laser cavities by assuring that each of the several support members operates at essentially the same temperature, and in one embodiment, even permits control of the operating temperature.

DETAILED DESCRIPTION OF THE INVENTION

Figure 1:
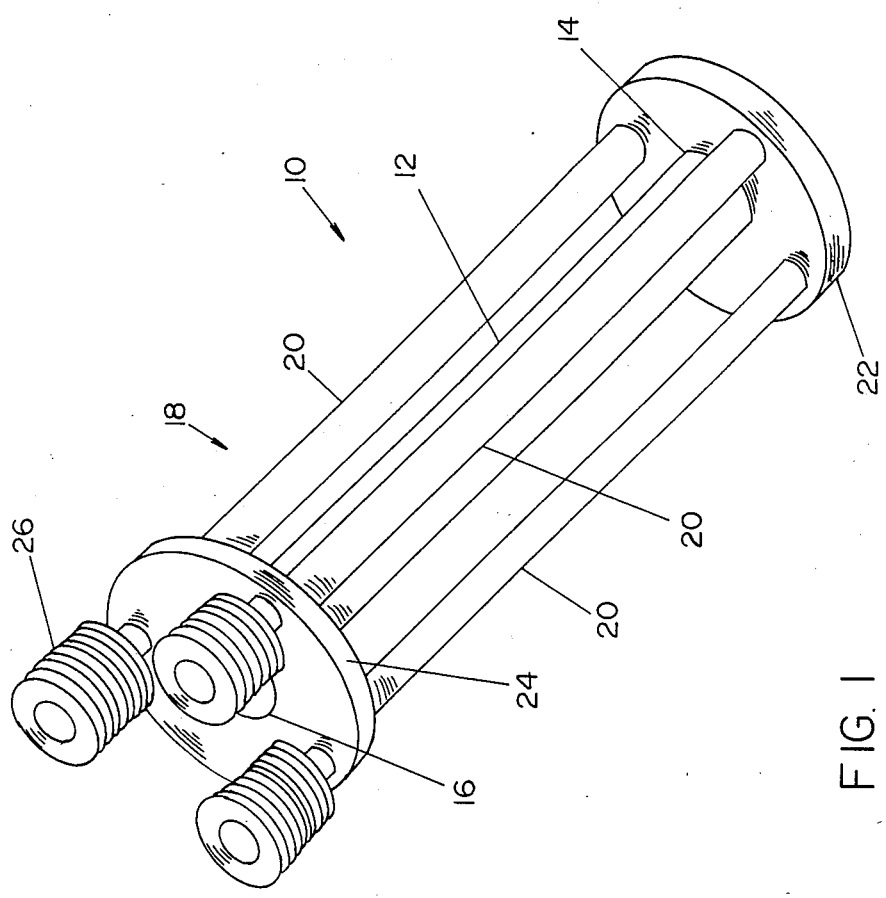
FIG. 1 is a simplified perspective view of one embodiment of the invention in which each of several heat pipes is attached to a common end plate of the laser structure.

FIG. 1 depicts one embodiment of the invention in a simplified perspective view in which laser cavity 10 includes laser 12 with mirrored ends 14 and 16 which are supported and aligned by cage-like support structure 18. Support structure 18 is constructed of several rod-like heat pipes 20 and end plates 22 and 24. Each heat pipe 20 may have cooling fins 26 attached to one end to permit air cooling which removes heat from heat pipes 20 and controls their temperature. Cooling fins 26 then also may be used to determine the condenser section of each heat pipe 20 by creating a cooler region than all others on the heat pipe.

End plates 22 and 24 are constructed of good thermally conductive material, and, with appropriate thickness for the heat to which the structure is subjected, maintain those regions at end plate 22, with very little temperature difference. Therefore, end plates 22 and 24 maintain all the heat pipes at or near the same temperature. Considering that by their nature heat pipes 20 themselves have even less temperature gradient over their lengths than do conductive end plates 22 and 24, the entire assembly is maintained at essentially a common temperature.

The result is high thermal stability which, in turn, furnishes a high degree of stability in alignment.

Figure 2:
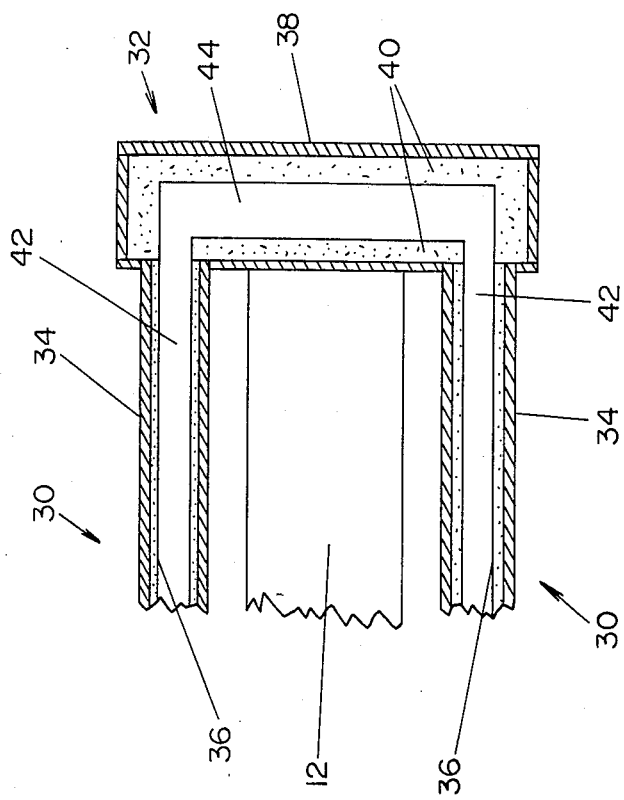
FIG. 2 shows an alternate embodiment of the invention in partial cross section and pictures only the structure near one end plate which is similar in external appearance to end plate 22 of FIG. 1.

FIG. 2, which is a partial cross section of an alternate embodiment, shows only the structure near one end chamber 32 which is similar in outside appearance to end plate 22 of FIG. 1, but which is hollow and constructed to act as an interconnecting section for heat pipes 30.

End chamber 32 is constructed similarly to heat pipes 30, each of which has a casing 34 and wick structure 36 in intimate contact with casing 34. In similar fashion end chamber 32 has casing 38 and wick structure 40 attached to the inside surface of casing 38. The function of hollow end chamber 32 is to furnish an interconnection by which both liquid and vapor can be interchanged between heat pipes 30.

The vapor interchange is accomplished simply because both heat pipe vapor spaces 42 are open to space 44 within hollow end chamber 32. During construction, space 44 of end chamber 32, is treated like the heat pipes, and unwanted gases are evacuated from it. During operation any imbalance between the vapor pressures within heat pipes is quickly corrected automatically by vapor flow from the higher pressure heat pipes to the lower pressure heat pipes through end chamber 32.

The action is similar, although possibly somewhat slower, for liquid. Insufficient liquid at the evaporator of any heat pipe causes increased capillary flow from wick structure 40 within end chamber 32, which, in turn, draws liquid by capillary action from wick 36 of the other heat pipes. To accomplish this, wick structure 36 of the heat pipes must be put into intimate contact with or made integral with wick structure 40 of chamber 32. Such construction techniques are, however, well known in the art of constructing heat pipes.

The structure shown in FIG. 2 is essentially that of a multiple branch heat pipe, but the operation differs slightly in that end chamber 32 is not actually required to accept or reject heat through its casing wall or the wick structure thickness, and therefore wick structure 40 can be constructed with greater thickness than a conventional heat pipe might use, thereby making it easier to transport larger quantities of liquid by capillary action.

Figure 3:
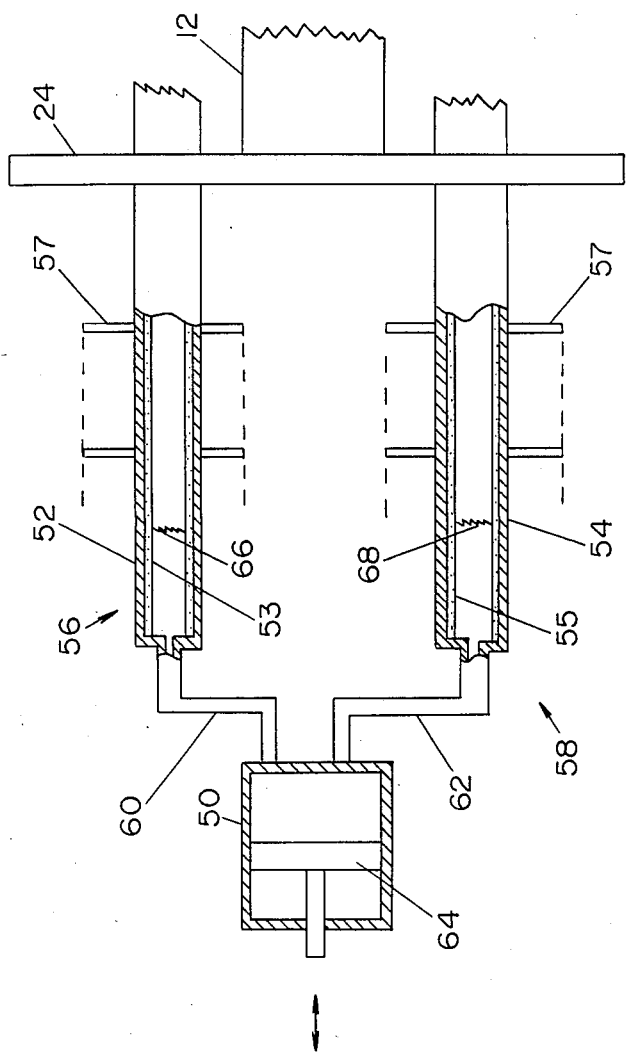
FIG. 3 is a simplified schematic diagram of the interconnection of the vapor spaces of multiple heat pipes into a reservoir of non-condensible gas.

FIG. 3 is a simplified schematic diagram of an added feature of the invention in which variable pressure non-condensible gas reservoir 50 is used to control the temperatures of heat pipes 52 and 54. Heat pipes 52 and 54 are conventional heat pipes attached to end plate 24 as in FIG. 1 with wicks 53 and 55 and fins 57, except their condenser regions 56 and 58 are interconnected with gas reservoir 50 by pipes 60 and 62 instead of having external cooling fins as in FIG. 1.

Gas reservoir 50 may be furnished with a pressure adjustment means, shown as moveable piston 64, which therefore affects the pressure of the non-condensible gas within reservoir 50 and also within heat pipes 52 and 54.

The presence of the non-condensible gas in the heat pipes creates a boundary between the heat pipes' vapor and the non-condensible gas in each heat pipe. These boundaries, depicted in FIG. 3 at 66 and 68 vary in position for each heat pipe, but nevertheless determine that each heat pipe operates so that the vapor pressure is the same as the non-condensible gas pressure determined by reservoir 50. Identical vapor pressures within heat pipes of the same liquid require identical temperatures, so that all the heat pipes interconnected with reservoir 50 are forced to operate at the same temperature.

The added feature of the invention which encompasses the common non-condensible gas reservoir therefore assures that the entire support structure of the laser operates not only at essentially the same temperature, but also at the specific temperature determined by pressure control means 64 of reservoir 50.

The goal of the invention of thermal stabilization is thereby accomplished, and taken one step further to the control of the temperature of operation.

Figure 4:
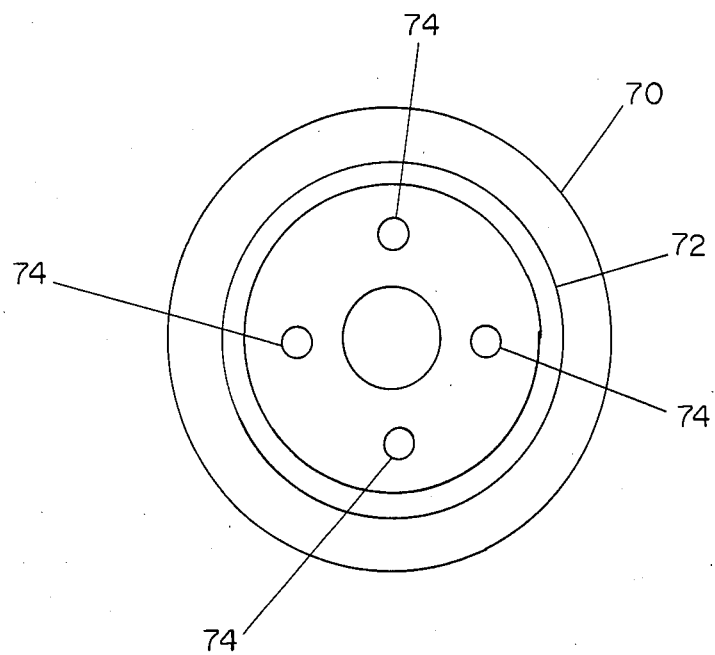
FIG. 4 is an end-on view of an end plate using a heat pipe to stabilize the end plate temperature.

FIG. 4 depicts a simple alternate embodiment to end plate 22 of laser cavity 10 of FIG. 1. In FIG. 4, which is an end-on view of end plate 70, additional heat pipe 72 is attached directly to end plate 70. Heat pipe 72, which is of conventional internal construction, is formed into a toroid so that it conducts heat from any one location on end plate 70 to any other location, thus equalizing the temperature of end plate 70. It therefore supplements the thermal conductivity of end plate 70 and better assures that the temperatures of all the other heat pipes 74 will be the same. Thereby a laser cavity with superior mechanical stability is made available.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance thermally conductive straps could be bonded to the several heat pipes at intervals rather than attaching plates to the heat pipe ends, or pipes could be used to interconnect the vapor spaces and wick structure of heat pipes rather than using a common end plate. Moreover, if improved conductivity is required, aluminum could be replaced with copper on the thermally conductive structures.

Also, other means could be used for controlling the reservoir pressure, such as varying its temperature to vary its pressure.

What is claimed as new and for which Letters Patent of the United States are desired to be secured is:

1. A temperature stabilized laser cavity support structure comprising:
   at least two heat pipes functioning as structural elements in a laser cavity; and
   thermal stabilization means attached to all the heat pipes and furnishing a heat transfer path between them to maintain the heat pipes at essentially the same temperature.

2. The laser cavity support structure of claim 1 wherein the heat pipes span the length of the laser light path and structurally support laser mirrors.

3. The laser cavity support structure of claim 1 wherein the thermal stabilization means is a thermally conductive end plate attached to all the heat pipes.

4. The laser cavity support structure of claim 1 wherein the thermal stabilization means is a sealed hollow structure with its interior space interconnected with the interior space of all the heat pipes.

5. The laser cavity support structure of claim 1 wherein the thermal stabilization means is a sealed hollow structure with its interior space interconnected with the interior space of all the heat pipes and containing a wick structure to which all the wick structures of the heat pipes are attached.

6. The laser cavity support structure of claim 1 wherein the thermal stabilization means is a reservoir containing non-condensible gas and which is interconnected with the condenser regions of all the heat pipes.

7. The laser cavity support structure of claim 6 wherein the reservoir further includes pressure adjustment means attached to the reservoir which permits control of the pressure of the non-condensible gas within the reservoir.

8. The laser cavity support structure of claim 1 wherein the thermal stabilization means is an end plate attached to all the structural element heat pipes with an additional heat pipe attached to the end plate to equalize the temperatures on the end plate.

* * * * *